United States Patent [19]
Tabata et al.

[11] Patent Number: 5,936,663
[45] Date of Patent: Aug. 10, 1999

[54] BINOCULAR DISPLAY APPARATUS

[75] Inventors: Seiichiro Tabata, Hino; Yoshiaki Hashimoto, Hachioji, both of Japan

[73] Assignee: Olympus Optical Co., Ltd., Tokyo, Japan

[21] Appl. No.: 08/929,611

[22] Filed: Sep. 15, 1997

[30] Foreign Application Priority Data

Sep. 26, 1996 [JP] Japan ..................................... 8-254840

[51] Int. Cl.⁶ ................................................. H04N 13/04
[52] U.S. Cl. ............................................... 348/51; 348/53
[58] Field of Search ................................ 348/51, 53, 42, 348/47, 46; H04N 13/04

[56] References Cited

U.S. PATENT DOCUMENTS

| | | | |
|---|---|---|---|
| 4,704,627 | 11/1987 | Yuyama | 348/42 |
| 4,734,756 | 3/1988 | Butterfield | 348/53 |
| 4,751,570 | 6/1988 | Robinson | 348/47 |
| 5,140,415 | 8/1992 | Choquot | 348/46 |
| 5,175,616 | 12/1992 | Milgram | 348/47 |
| 5,320,538 | 6/1994 | Baum | 348/14 |

FOREIGN PATENT DOCUMENTS 7-167633  7/1995  Japan .

*Primary Examiner*—Howard Britton
*Attorney, Agent, or Firm*—Frishauf, Holtz, Goodman, Langer & Chick, P.C.

[57] ABSTRACT

A binocular display apparatus includes a left display unit for displaying a left-eye image, a right display unit for displaying a right-eye image, a left designator for designating the position of a left-eye specific area in the display plane of the right display unit, a right designator for designating the position of a right-eye specific area in the display plane of the right display unit based on a correspondence relation with respect to the position of the specific area, an evaluating section for numerically expressing images lying in the specific areas by use of image evaluation parameters, a calculator for calculating a similarity between the left-eye and right-eye images in the specific areas based on the numerically expressed two image evaluation parameters, and a modifier for modifying the right image based on the similarity S calculated by the calculator.

14 Claims, 12 Drawing Sheets

BINOCULAR DISPLAY APPARATUS

BACKGROUND OF THE INVENTION

This invention relates to a binocular display apparatus capable of providing a three-dimensional (3-D) image to an observer by use of right-eye and left-eye images having parallax.

In a visual display device or visual display system, various types of binocular displays which can display an image in a stereoscopic fashion are proposed.

FIG. 16 is an external perspective view showing a state wherein a head mounted display (HMD) 100 which is one example of a conventional binocular display of this type is used. The HMD 100 is one type of binocular display and is mounted on the head of an observer M such that a pair of left and right display units 101 each constructed by a display element and a magnifying optical system are respectively disposed in front of the left and right eyes of the observer M with the two end portions thereof supported by supporting frames 102. A head motion sensor 104 for detecting the motion of the head is mounted on a central portion of a coupling frame 103 which couples the other end portions of the supporting frames 102, that is, on a portion set on the top portion of the head.

On each of the supporting frames 102, an external connector 106 and headphones 107 for outputting a sound into the ears are mounted by a supporting member 105. The external connector 106 is connected to a portable data processor 120 by a connection cable 110. Operation buttons 121 are provided on the data processor 120 and the observer M selectively operates the operation buttons 121 so as to observe a desired image.

By operating the operation buttons 121 of the data processor 120, the left-eye image of the display unit is supplied to the left eye of the observer M and the right-eye image thereof is supplied to the right eye of the observer M so that the observer M can observe the 3-D image. At this time, since the 3-D image corresponds to the motion of the head detected by the head motion sensor 104 and is accompanied by a corresponding sound, the image can be observed with a natural sense.

In the binocular display such as the HMD 100, if the state of observation of a 3-D image by the binocular display is greatly different from the image pickup state of a 3-D video camera, it becomes difficult for the observer M to perform fusion of the images (image fusion), and as a result, the image may be observed as double images or as a 3-D image which is extremely unnatural. One concrete example of this problem is explained below.

As shown in FIG. 17A, when images 133 and 134 taken by two 3-D video cameras 131 and 132 disposed in parallel are observed by use of a binocular display 135, image-fusion cannot be attained without greatly inclining the left and right eyes of the observer M inwardly.

Further, as shown in FIG. 17B, when images 133 and 134 taken by two 3-D video cameras 131 and 132 disposed with the optical axes thereof inclined inwardly are observed by use of an HMD 136 having optical systems arranged in parallel, left and right images observed by left and right eyes IL and IR are subjected to fusion at the infinite point. In this case, the observer observes the image with an extremely unnatural sense.

As a means for solving the above problem, a means for controlling the parallax of a 3-D image as is disclosed in Jnp. Pat. Appln. KOKAI Publication No. 7-167633, for example, is proposed. The means disclosed in the above publication calculates the parallax of the left and right images or the three-dimensional position thereof and controls the parallax so as to reproduce the depth position of the image on the surface of the binocular display unit or at a specified distance by use of the result of calculation. Further, in the above publication, an example in which the parallax is controlled to reproduce the depth position of an image which the observer now wants to observe on the surface of the binocular display unit or at a specified distance by use of a line-of-sight detector is also disclosed.

The "parallax" indicates the amount of positional deviation between image portions in corresponding positions of the left and right images. Therefore, when the parallax is calculated, for example, it is necessary to detect an image portion included in the right image and corresponding to a specified image portion of the left image when attention is given to the specified image portion of the left image, detect the position of the detected specified image portion and then derive the amount of positional deviation between the left and right images.

The conventional apparatus having the above parallax control section has the following problem. That is, in the conventional apparatus, since it is necessary to detect corresponding specified image portions in the left and right images, the process cannot be started until all of the data items of one image plane of the left and right images are stored into the memory. Therefore, it is necessary to use a memory of large storage capacity. Further, there occurs a problem that image signals sequentially supplied cannot be processed on the real-time basis. The line of sight of the observer M may sometimes fluctuate while observing an image containing a close-range view and distant view, and in such a case, the amount of parallax to be controlled will greatly vary and a 3-D image cannot be stably observed.

An object of this invention is to provide a binocular display apparatus capable of easily and adequately providing a three-dimensional image which can be easily synthesized by the observer without particularly effecting the calculation for parallax and the like.

BRIEF SUMMARY OF THE INVENTION

This invention provides a binocular display apparatus comprising a left-eye image display unit for displaying a left-eye image; a right-eye image display unit for displaying a right-eye image; a left-eye (right-eye) specific area position designator for designating the position of a left-eye (right-eye) specific area in the display plane of the left-eye (right-eye) image display unit; a right-eye (left-eye) specific area position designator for designating the position of a right-eye (left-eye) specific area in the display plane of the right-eye (left-eye) image display unit based on a correspondence relation previously determined for the position of the left-eye (right-eye) specific area; a left-eye image evaluation parameter calculator for numerically expressing an image lying in the left-eye specific area by use of image evaluation parameters; a right-eye image evaluation parameter calculator for numerically expressing an image lying in the right-eye specific area by use of image evaluation parameters; a similarity calculator for calculating the similarity between the left-eye image in the left-eye specific area and the right-eye image in the right-eye specific area by comparing the numerically expressed left-eye image evaluation parameter value with the numerically expressed right-eye image evaluation parameter value; and an image modifier for modifying at least one of the left and right images based on the similarity calculated by the similarity calculator.

This invention provides a binocular display apparatus in which image signals representing three-dimensional image frames constructed by left-eye and right-eye images are sequentially input according to the time series of the three-dimensional image frames and which comprises a left-eye image display unit for displaying the left-eye image; a right-eye image display unit for displaying the right-eye image; a left-eye (right-eye) specific area position designator for designating the position of a left-eye (right-eye) specific area in the display plane of the left-eye (right-eye) image display unit; a right-eye (left-eye) specific area position designator for designating the position of a right-eye (left-eye) specific area in the display plane of the right-eye (left-eye) image display unit based on a correspondence relation previously determined for the position of the left-eye (right-eye) specific area; a left-eye image evaluation parameter calculator for numerically expressing an image lying in the left-eye specific area by use of image evaluation parameters; a right-eye image evaluation parameter calculator for numerically expressing an image lying in the right-eye specific area by use of image evaluation parameters; a similarity calculator for calculating the similarity between the left-eye image in the left-eye specific area and the right-eye image in the right-eye specific area by comparing the numerically expressed left-eye image evaluation parameter value with the numerically expressed right-eye image evaluation parameter value; and an image modifier for comparing the similarity associated with one of the three-dimensional image frames sequentially provided with the similarity associated with a different one of the three-dimensional image frames which lies before the former three-dimensional image frame and modifying at least one of the right-eye and left-eye images based on the result of similarity comparison.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Figure 1:
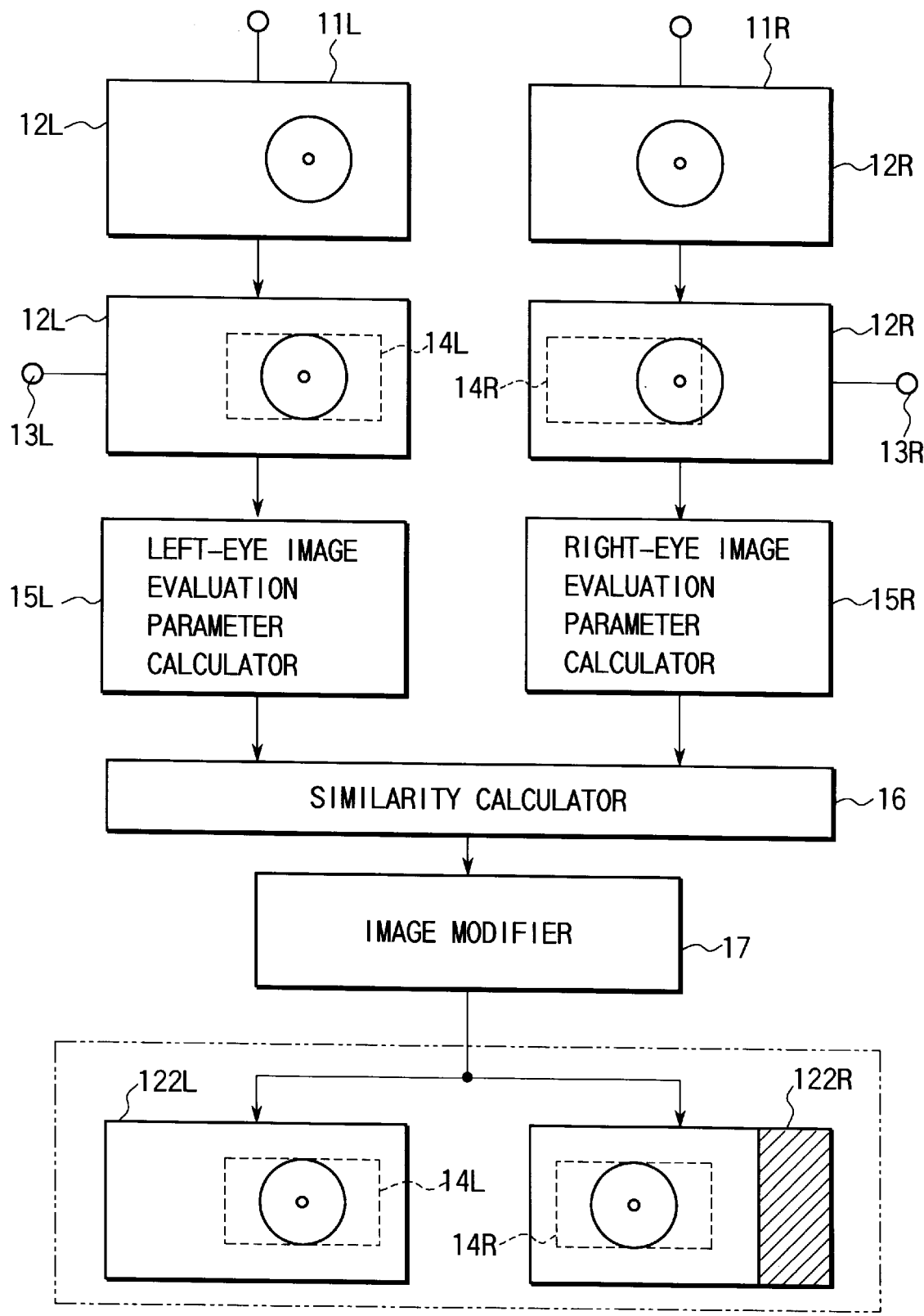
FIG. 1 is a block diagram showing the basic function of a binocular display apparatus according to a first embodiment of this invention.

FIG. 1 is a block diagram showing the basic function of a binocular display apparatus according to a first embodiment of this invention. Left and right images are supplied from a three-dimensional video camera (not shown), three-dimensional (3-D) video player or the like and left-eye and right-eye image signals are respectively supplied to a left video signal input port 11L which is a constituent of a left-eye image display unit and a right video signal input port 11R which is a constituent of a right-eye image display unit. That is, a video signal corresponding to a left-eye image 12L and a video signal corresponding to a right-eye image 12R are input.

A left-eye specific area position designator 13L designates a partial area surrounded by broken lines in the left-eye image 12L, that is, a left-eye specific area 14L. A right-eye specific area position designator 13R designates a partial area surrounded by broken lines in the right-eye image 12R, that is, a right-eye specific area 14R based on a correspondence relation previously determined for the right-eye specific area 14R. The positions of the specific areas 14L and 14R are locations which the observer M closely observes on the image plane. A method for designating the specific area position will be explained in detail in another embodiment which will be described later.

A left-eye image evaluation parameter calculator 15L numerically expresses a portion of the image 12L lying in the left-eye specific area 14L by use of a left-eye image evaluation parameter or parameters. Likewise, a right-eye image evaluation parameter calculator 15R numerically expresses a portion of the image 12R lying in the right-eye specific area 14R by use of a right-eye image evaluation parameter or parameters. As the image evaluation parameter, for example, average luminance of images lying in the areas, a dispersive value of luminance, an average spatial frequency, average chromaticity, a dispersive value of chromaticity or the like may be used.

A similarity calculator 16 compares a left-eye image evaluation parameter value obtained in the left-eye image evaluation parameter calculator 15L with a right-eye image evaluation parameter value obtained in the right-eye image evaluation parameter calculator 15R and calculates the similarity between the left-eye image 12L in the left-eye specific area 14L and the right-eye image 12R in the right-eye specific area 14R based on the video signals according to a difference between the compared parameter values.

An image modifier 17 modifies the left and right images 12L and 12R based on the similarity calculated by the similarity calculator 16. The process for modifying the image includes a process for shifting the entire image in the horizontal direction and a process for deforming and correcting the image so as to correct the image to enhance the similarity between the images in the specific areas 14L and 14R. In this embodiment, for example, it is supposed that the entire portion of the right-eye image 12R is shifted in the left direction in the drawing. As the result of shifting, left-eye and right-eye images 122L and 122R are obtained. In this case, a black portion of an amount which is the same as the shifting amount is displayed on the right end portion of the right-eye image 122R as the result of shifting.

Figure 2:
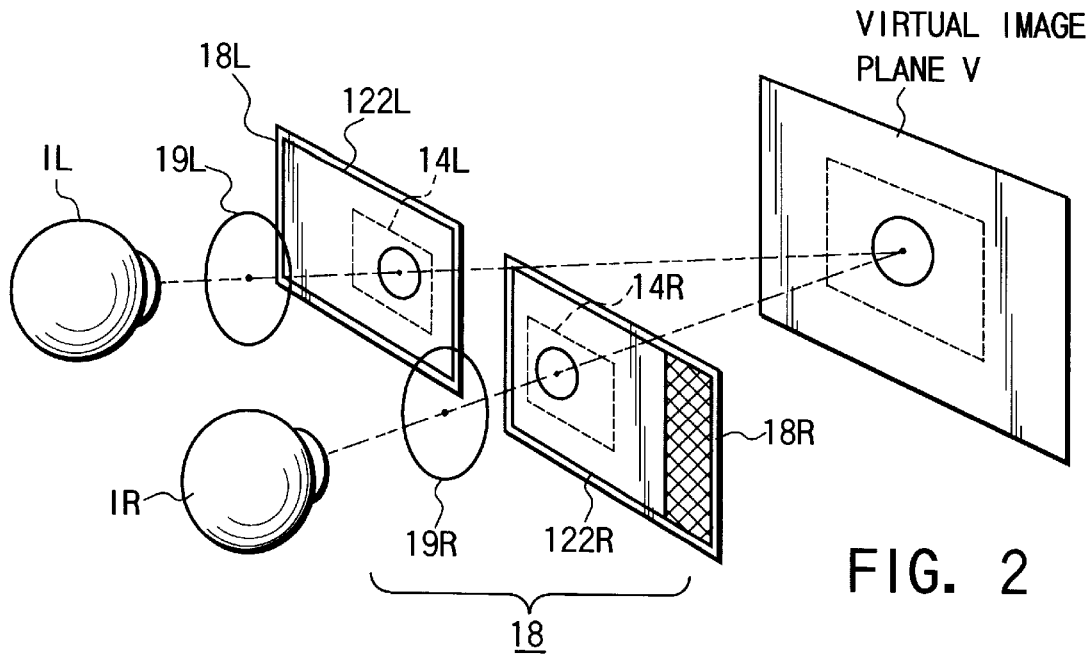
FIG. 2 is a view showing the schematic construction of a binocular display in the binocular display apparatus according to the first embodiment of this invention.

FIG. 2 is a view showing the schematic construction of a binocular display 18. As shown in FIG. 2, the left-eye and right-eye images 122L and 122R which have been subjected to the modification process are displayed on the binocular display 18 (including a left-eye image display unit 18L and a right-eye image display unit 18R).

By repeatedly effecting the above operation for each video frame, images which are extremely similar to each other are provided for the left eye 1L of the observer M which closely observes the left-eye specific area 14L in the image 122L and the right eye 1R of the observer M which closely observes the right-eye specific area 14R in the image 122R and thus images which can be easily and adequately synthesized can be provided. In FIG. 2, V indicates a virtual image plane and 19L, 19R respectively indicate left and right eyepiece optical systems.

Unlike the conventional case, according to the first embodiment described above, a process for detecting a corresponding image is not effected, and therefore, the capacity of the image memory can be made small. Further, it is possible to process sequentially supplied video signals on the real-time basis.

Figure 3:
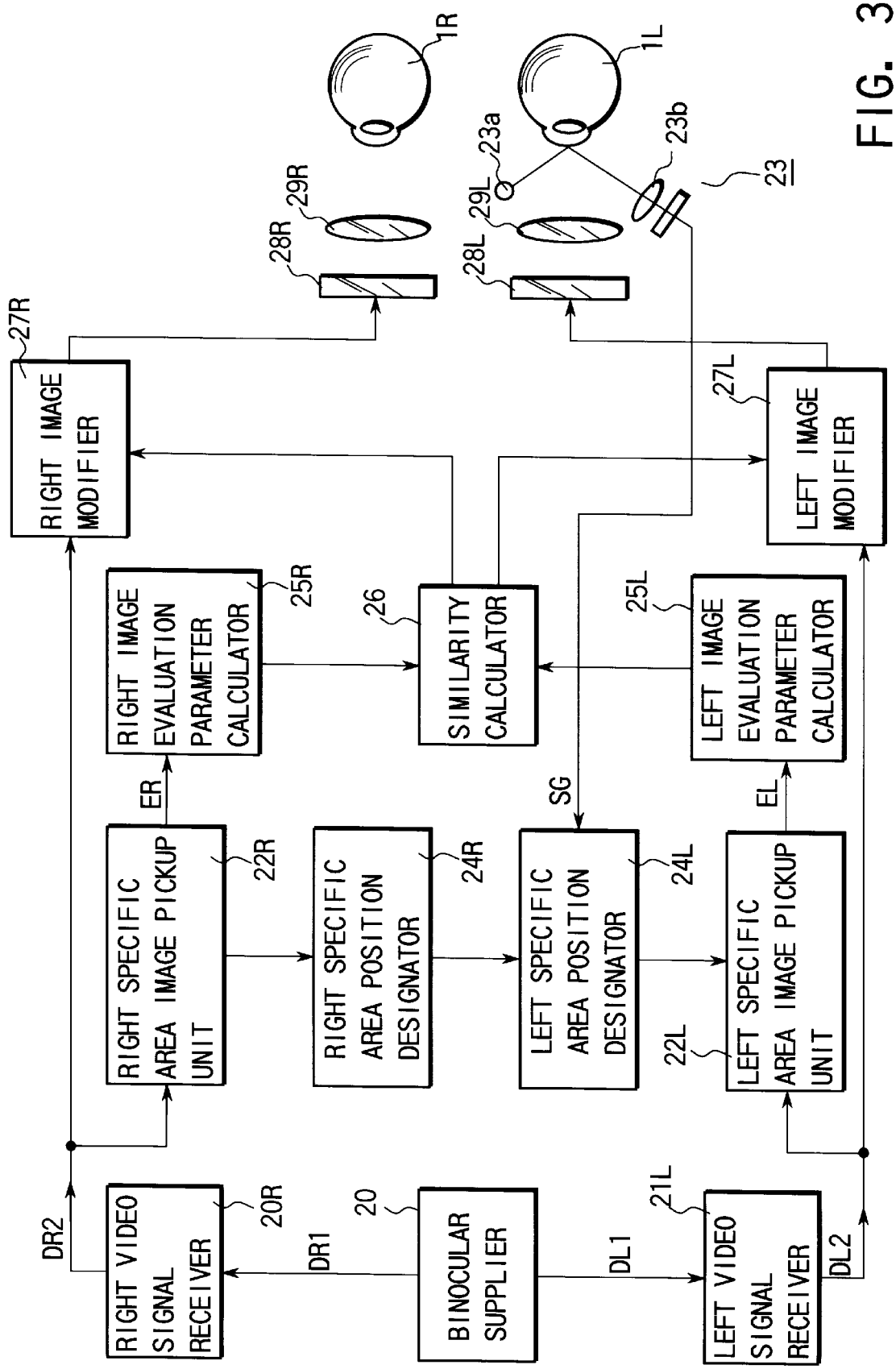
FIG. 3 is a block diagram showing the concrete construction of a binocular display apparatus according to a second embodiment of this invention.

FIG. 3 is a block diagram showing the concrete construction of a binocular display apparatus according to a second embodiment of this invention. A left video signal DL1 and a right video signal DR1 output from a 3-D video supplier 20 including a 3-D camera and a 3-D player are respectively supplied to a left video signal input port 21L and a right video signal input port 21R and subjected to the A/D conversion. A left video signal DL2 and right video signal DR2 which are converted into a digital form are each divided into two portions.

One of the two divided portions of the left video signal DL2 is supplied to a left specific area image pickup unit 22L and the other portion thereof is supplied to a left image modifier 27L. Likewise, one of the two divided portions of the right video signal DR2 is supplied to a right specific area image pickup unit 22R and the other portion thereof is supplied to a right image modifier 27R.

A line-of-sight detector 23 (including a detection light source 23a and a photosensor 23b) disposed near the eyes 1L and 1R of the observer M detects the rotation angle of the eyes 1L and 1R of the observer M to measure a small area in the image plane which the observer M closely observes. The line-of-sight detector 23 may be used to detect the line of sight of one of the eyes 1L and 1R of the observer M. In the example of FIG. 3, the detector is disposed near the left eye 1L. A signal detected by the line-of-sight detector 23, that is, a line-of-sight direction angle signal SG is supplied to a left specific area position designator 24L.

The left specific area position designator 24L first derives a closely observed coordinate (xL, yL) on the image display plane based on the line-of-sight direction angle signal SG. The coordinate can be derived by multiplying the line-of-sight direction angle by a distance to the image display plane. A coordinate signal from the left specific area position designator 24L is supplied to a right specific area position designator 24R. The right specific area position designator 24R derives a right specific area position based on a signal from the left specific area position designator 24L. The relation of the right specific area position with respect to the left specific area position is different depending on a display used.

Figure 4A:
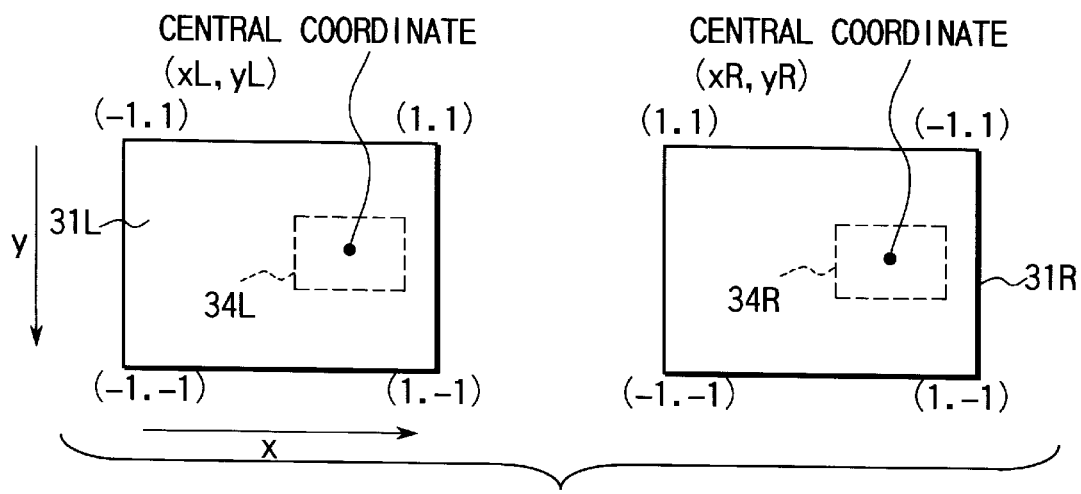
FIGS. 4A and 4B are a diagram and view for illustrating the operation of the binocular display apparatus according to the second embodiment of this invention.
Figure 4B:
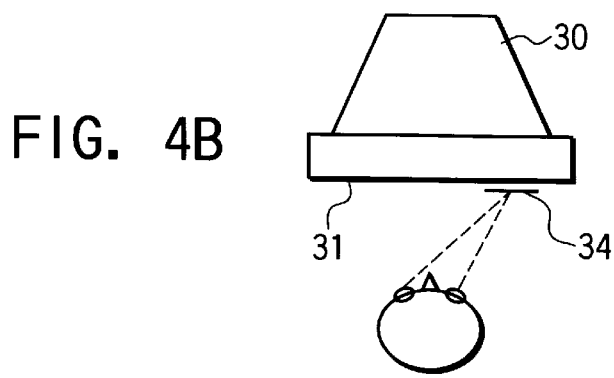

FIGS. 4A and 4B show a case wherein a 3-D television whose CRT display plane is watched by use of liquid crystal shutter eyeglasses or polarization eyeglasses is used as a display. As shown in FIG. 4A, it is desirable that the positional relations of specific areas 34L and 34R on left and right display planes 31L and 31R coincide with each other. This is because two images can be easily fused and the observer M can easily observe the image if the left and right specific areas 34L and 34R coincide with each other as shown in FIG. 4A since the left and right images are displayed together on the specific area 34 of one display plane 31 in a 3-D TV of the above type as shown in FIG. 4B. Therefore, the left and right specific area positions in this case will have the following relation.

$$(xR, yR) = (xL, yL) \tag{1}$$

Figure 5A:
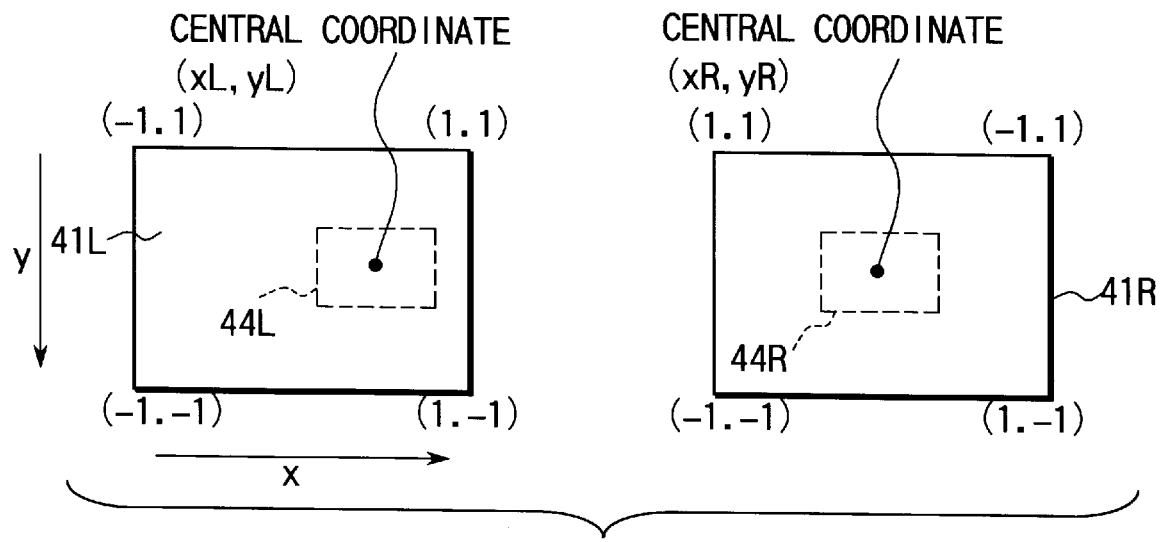
FIGS. 5A and 5B are a diagram and view for illustrating the operation of the binocular display apparatus according to the second embodiment of this invention.

As shown in FIG. 5A, in the case of a two-display plane type 3-D TV such as an HMD, the left and right specific areas 44L and 44R are preferably deviated in the horizontal direction according to the characteristic of the optical system of the HMD. The reason is as follows.

Figure 5B:
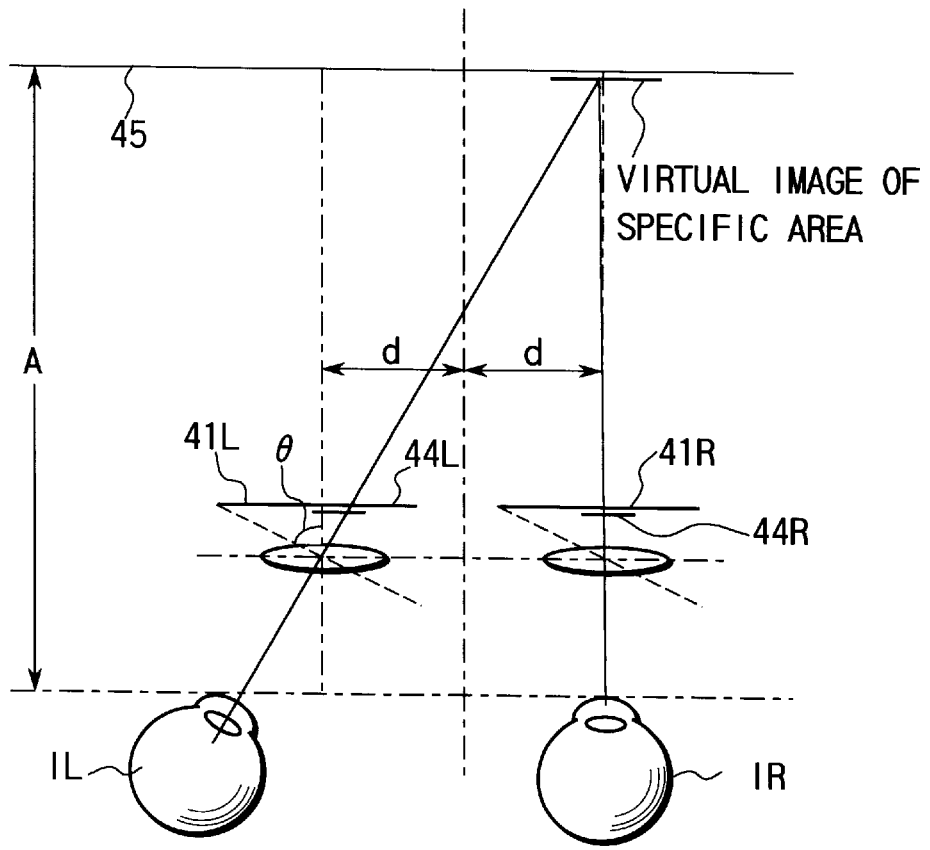

As shown in FIG. 5B, in the case of HMD, since left and right display planes 41L and 41R are provided for the left and right eyes 1L and 1R and the observer M observes a virtual image on a virtual image plane 45 of the left and right display planes 41L and 41R, the image can be easily observed if the left and right specific area positions coincide with each other on the virtual image plane 45. it is preferable that the central coordinate position (xR, yR) of the right specific area 44R satisfies the following equation (2).

$$xR = xL - \{2d/(A \cdot \tan \theta)\}$$
$$yR = yL \tag{2}$$

where d is half a distance between the left and right lenses (d for the right eye is positive and d for the left eye is negative), θ indicates a half angle of field of the lens, and A is a distance from the eye to the virtual image plane (apparent distance).

The coordinate is normalized such that the left end of each of the left and right display planes 61L and 61R is expressed by "−1" and the right end thereof is expressed by "1". The deriving method is disclosed in Japanese Patent Application No. 8-28856, for example. The summary thereof is explained below with reference to FIGS. 6 and 7.

Figure 6:
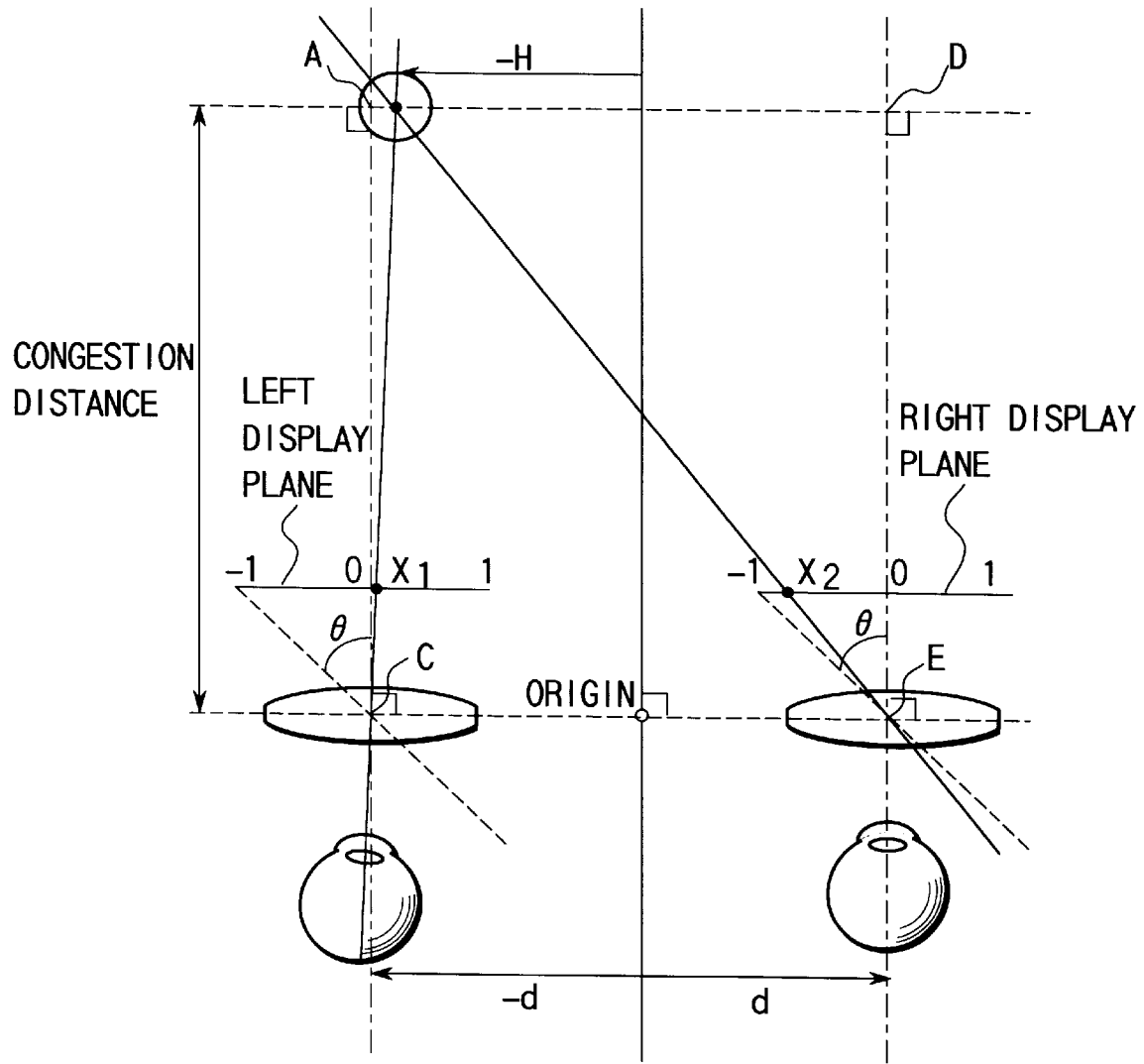
FIG. 6 is a view for illustrating the operation of the binocular display apparatus according to the second embodiment of this invention.

First, the condition of a 3-D image to be actually displayed on a display plane is derived. Then, the relation between the congestion distance L and the parallax at the time of observation of the 3-D image is erived. When the image fusion is attained at the congestion distance L and a sphere is observed as if it lies on a horizontal position H as shown in FIG. 6, a horizontal position X1 of the sphere on the left display plane and a horizontal position X2 of the sphere on the right display plane are respectively expressed by the following equations (3) and (4).

$$X1=\{d+(-H)\}/(L\cdot\tan\theta) \quad (3)$$

$$X2=\{-d+(-H)\}/(L\cdot\tan\theta) \quad (4)$$

Figure 7:
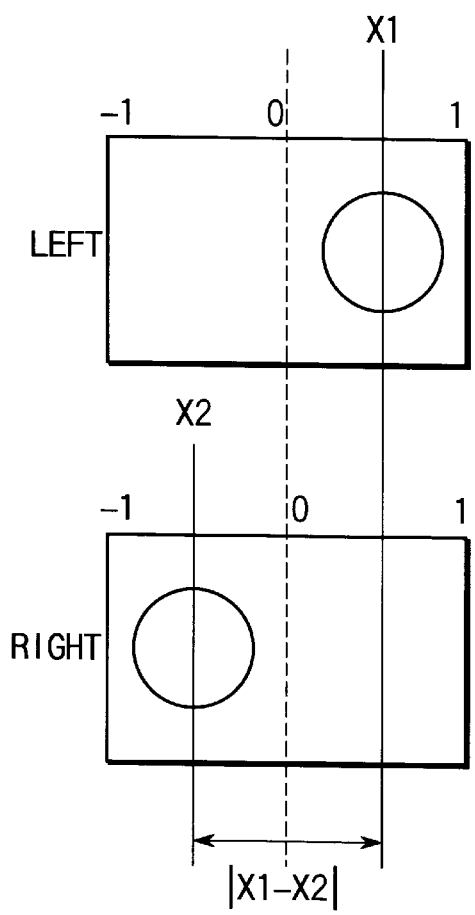
FIG. 7 is a diagram for illustrating the operation of the binocular display apparatus according to the second embodiment of this invention.

The horizontal positions X1 and X2 are normalized by setting the central position of the display area in the horizontal direction to "0" and setting the length of the display area in the horizontal direction to "2" as shown in FIG. 7.

The equation (3) can be derived based on the fact that a triangle formed by points A, B and C in FIG. 6 is similar in shape to a triangle formed by the origin O and points X1 and C on the left display plane.

Likewise, the equation (4) can be derived based on the fact that a triangle formed by points D, B and E is similar in shape to a triangle formed by the origin O and points X2 and E on the right display plane.

The equations (3) and (4) can be rewritten as follows.

$$|X1-X2|=2d/(L\cdot\tan\theta) \quad (5)$$

In this embodiment, the left side |X1−X2| of the equation (5) is referred to as parallax. The equation (5) indicates that not only the horizontal position H but also the congestion distance L at the time of image synthesis can be determined when the parallax is determined.

Generally, the position of the right specific area 44R is deviated to the left side in comparison with the position of the left specific area 44L. The deviation amount is 5.6% of the length of the display plane in the horizontal direction when d=32.5 mm, θ=30 degrees and L=1000 mm.

In the case of the 3-D TV described with reference to FIGS. 4A and 4B or in the case of a two-display plane type 3-D TV described with reference to FIGS. 5A and 5B, the position of the right specific area 44R is unconditionally determined once the position of the left specific area 44L is determined.

Referring to FIG. 3 again, the left specific area image pickup unit 22L receives a coordinate signal (xL, yL) from the left specific area position designator 24L. Likewise, the right specific area image pickup unit 22R receives a coordinate signal (xR, yR) from the right specific area position designator 24R. Each of the left and right specific area image pickup units 22L and 22R picks up a video signal in an area having the received coordinate position set as a center. The area corresponds to a specific area in this embodiment. It is preferable that the area of the specific area satisfies the following expression (6).

$$\text{(the area of the specific area)}/\text{(display area)} < (30 \text{ degrees})/(\text{the angle of field of the eyepiece optical system of the HMD})^2 \quad \cdots (6)$$

The expression (6) is derived based on the fact that the effective range of field which a man can instantaneously detect and accept is approx. 30 degrees ("Physiological Optics 16" by Toyohiko Hatada, Opluse E, No. 74, pp 121–130, (1986)).

According to the above expression, it is sufficient if the area of the specific area is set to one-fourth or less of the area of the display plane when the angle of field of the eyepiece optical system is 60 degrees, for example.

Left and right specific area video signals EL, ER extracted by the left and right specific area image pickup units 22L, 22R are respectively supplied to left and right image evaluation parameter calculators 25L, 25R.

In the left and right image evaluation parameter calculators 25L, 25R, images are evaluated by use of a previously specified image evaluation parameter or parameters (for example, average luminance of images lying in the areas, a dispersive value of luminance, an average spatial frequency, average chromaticity, a dispersive value of chromaticity). As the number of types of the image evaluation parameters is larger, the similarity which will be described later can be derived with higher precision. In this example, however, two types of image evaluation parameters, that is, the average luminance m of images and the dispersive value w of luminance are derived. A left image evaluation parameter value fL=(mL, wL) derived in the left image evaluation parameter calculator 25L and a right image evaluation parameter value fR=(mR, wR) derived in the right image evaluation parameter calculator 25R are supplied to a similarity calculator 26.

In the similarity calculator 26, the left and right image evaluation parameter values fL=(mL, wL) and fR=(mR, wR) are compared with each other to derive an S value associated with the similarity between the images in the left and right specific areas. As a method for calculating the S value, the following equation (7) can be used.

$$S=fR\cdot fL/|fR||fL| \quad (7)$$

where fR·fL=mRmL+wRwL, $|fR|=(mR2+wR2)^{1/2}$, and $$|fL|=(mL2+wL2)^{1/2}.$$

S is set in the range of 0≦S≦1. As the similarity is higher, the value S becomes larger. A similarity signal indicating the value S is supplied to left and right image modifiers 27L and 27R.

The left and right image modifiers 27L and 27R modify the left and right images based on the received similarity signals. The modifying process includes a process of shifting the image in the horizontal direction and a process for deforming (reducing, expanding) the image. As the S value becomes larger, the amount of modification becomes smaller, and as the S value becomes smaller, the amount of modification becomes larger. In the shifting process in the horizontal direction, the entire portions of the left and right video signals DL2 and DR2 from the left and right video signal input ports 21L and 21R are shifted in the horizontal direction. As a concrete means for shifting in the horizontal direction, a variable delay circuit or the like is used. It is possible to shift only one of the left and right images or both of them. When both of the left and right images are shifted, it is preferable to shift them in the opposite directions. At this time, it is necessary to shift the closely observed coordinate of the line-of-sight detector 23 by an amount equal to the shifting amount of the left image.

The left and right images modified as described above are converted into analog signals by D/A converters in the left and right image modifiers 27L and 27R and then supplied to left and right image display units 28L and 28R. On the left and right image display units 28L and 28R, images corresponding to the analog signals supplied thereto are displayed.

A sequence of above-described operations is repeatedly effected for each video frame. As a result, a preferable 3-D image which can be easily fused (subjected to fusion) and is almost free from the unnatural sense can be displayed.

In the first and second embodiments, the following modifications are contained.

Figure 8:
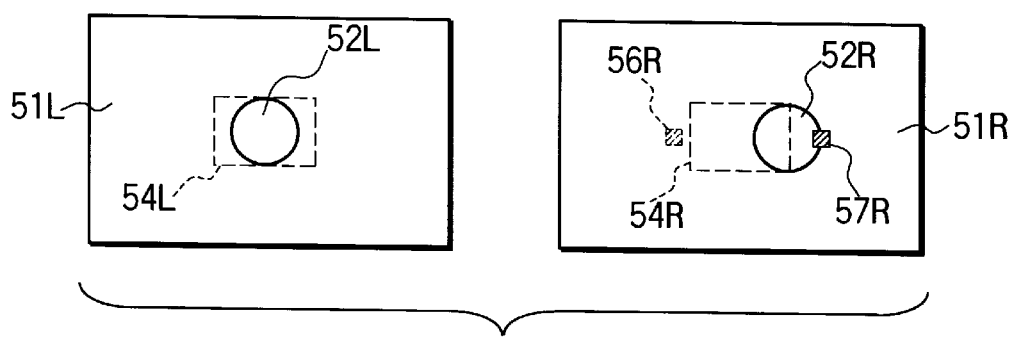
FIG. 8 is a diagram showing a modification of the binocular display apparatus according to the second embodiment of this invention.

(1) A modification direction determination area may be provided in addition to the specific area in order to obtain information on the modification direction of the image. For example, modification by the shifting in the horizontal direction is effected, modification direction determination areas 56R and 57R are provided on both sides of a right specific area 54R as shown in FIG. 8. The same similarity as that expressed by the equation (7) is derived for the image in the modification direction determination area 56R and the image in the left specific area 54L and the same similarity as that expressed by the equation (7) is derived for the image in the modification direction determination area 57R and the image in the left specific area 54L. The thus derived similarities are also supplied to the left and right image modifiers 27L and 27R at the same time as the afore-mentioned similarities are supplied. In the left and right image modifiers 27L and 27R, the similarities for the two modification determination areas 56R and 57R are compared with each other to determine the modification direction. In the case of FIG. 8, the S value of the similarity is larger for the modification direction determination area 57R than for the modification direction determination area 56R. Therefore, since it is understood that the right image is shifted in the right direction, the shifting direction is set to the left direction. The modification direction determination areas 56R and 57R are used only for acquiring information on the modification direction, the accuracy of calculation of the image evaluation parameters may be low. Therefore, the area of the determination area 56R and 57R can be set smaller than that of the specific area 54L and 54R.

As a result, the similarity between the images in the areas which the left and right eyes of the observer M closely observe can be enhanced and a 3-D image which can be easily fused by the observer M can be provided.

Figure 9:
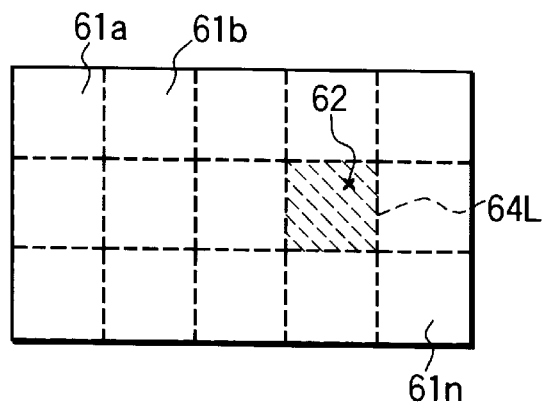
FIG. 9 is a diagram showing a modification of the binocular display apparatus according to the second embodiment of this invention.

(2) As a method for determining the specific area, a method for determining an area having the closely observing point of the observer M set at the center as the specific area is described, but the method is not limitative. For example, as shown in FIG. 9, it is possible to use a method for previously dividing the entire image area into a plurality of blocks 61a, 61b, . . . , 61n, selecting a close observation pint coordinate 62, and setting the selected block as a left specific area 64L. In this case, a right specific area 64R is determined to satisfy the equations (1) and (2). If the block of the left specific area 64L is selected, a corresponding right block is automatically selected.

With the above method, since an area to be extracted is previously determined, the processing time is significantly reduced. Further, the method has an advantage that the resolution of line-of-sight detection may be set low.

(3) As another method for determining the specific area, a method for detecting the locus of the close observation point in a preset period of time and setting the range of the locus as a specific area can be used. The eye-ball movement of a man includes a movement called saccadic movement. The movement is said to occur when a man extracts the image characteristic ("Physiological Optics 16" by Toyohiko Hatada, Opluse E, No. 74, pp 121–130, (1986)).

Figure 10:
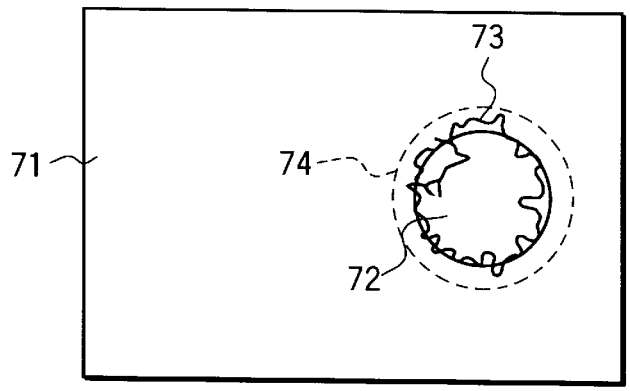
FIG. 10 is a diagram showing a modification of the binocular display apparatus according to the second embodiment of this invention.

FIG. 10 is a diagram showing a locus 73 of the saccadic movement of the line of sight in a preset period of time when an image 72 of an object is displayed on a display plane 71. The locus 73 represents an image area which the observer M wants to see. Therefore, a left specific area 74L is determined to surround the locus 73 of saccadic movement based on the physiological phenomenon.

Figure 11:
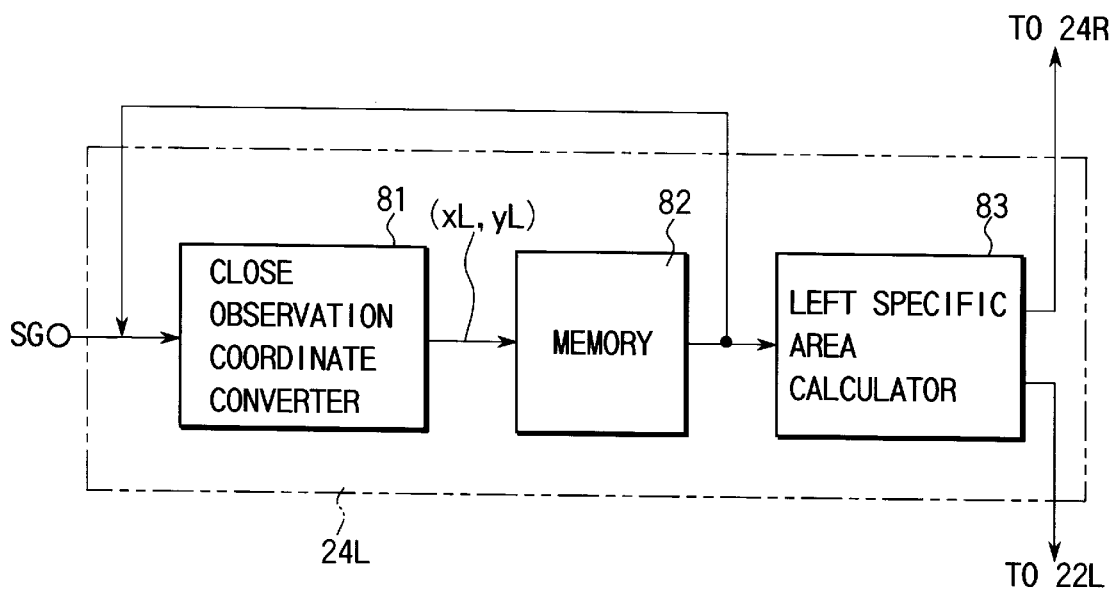
FIG. 11 is a diagram showing a modification of the binocular display apparatus according to the second embodiment of this invention.

When the above method is used, the left specific area position designator 24L shown in FIG. 3 is constructed as shown by a block diagram of FIG. 11. That is, if a line-of-sight direction angle signal SG from the line-of-sight detector 23 is input, it is converted into a close observation coordinate (xL, yL) by a close observation coordinate converter 81. In this respect, this method is the same as the aforementioned method. The thus converted coordinate signal is stored into a memory 82. This operation is repeatedly effected for a preset period of time, for example, approx. 500 ms.

All of the coordinates $\Sigma(xL, yL)$ accumulatively stored for a preset period of time as described above are read out from the memory 82 and input to a left specific area calculator 83. The left specific area calculator 83 derives an area surrounding all of the readout coordinates $\Sigma(xL, yL)$, that is, the left specific area 74L. A signal of the thus derived left specific area 74L is supplied to the right specific area position designator 24R and left specific area image pickup unit 22L. In the right specific area position designator 24R, a right specific area 74R (not shown) is determined to satisfy the equations (1) and (2).

In the above method, the area and shape of the specific areas 74L and 74R are not previously determined and an area which the observer M now wants to see can be determined as the specific area according to the content of the image. Therefore, in this method, a 3-D image which can be more easily fused in comparison with the case of the aforementioned method can be provided. Further, since the process based on all of the coordinates $\Sigma(xL, yL)$ accumulatively stored in the memory 82 for a preset period of time is effected, occurrence of a state in which the modification amount of a 3-D image is rapidly changed and the 3-D image fluctuates by a rapid change in the line-of-sight direction can be prevented. Thus, the operation can be stabilized.

(4) As the method for determining the left specific area, it is not always necessary to use the line-of-sight detector 23. For example, in the case of a device in which the observer M operates a mouse or joy stick to move a pointer which is displayed together with the 3-D image, the position of the pointer can be used instead of the close observation point of the line-of-sight detector 23. In this case, since the line-of-sight detector 23 becomes unnecessary, the device can be simplified in construction and can be made small and inexpensive.

(5) It is not always necessary to move the specific area. That is, in the case of a virtual reality device having a head motion sensor 104 mounted on the HMD to move an image according to the movement of the head of the observer M, the position of the specific area may be set at the center of the display plane since the close observation direction of the observer M substantially coincides with the direction of his head. In this case, since an electric circuit for variably specifying the specific area may be omitted, the device can be made simple in construction, small in size and inexpensive.

Figure 12:
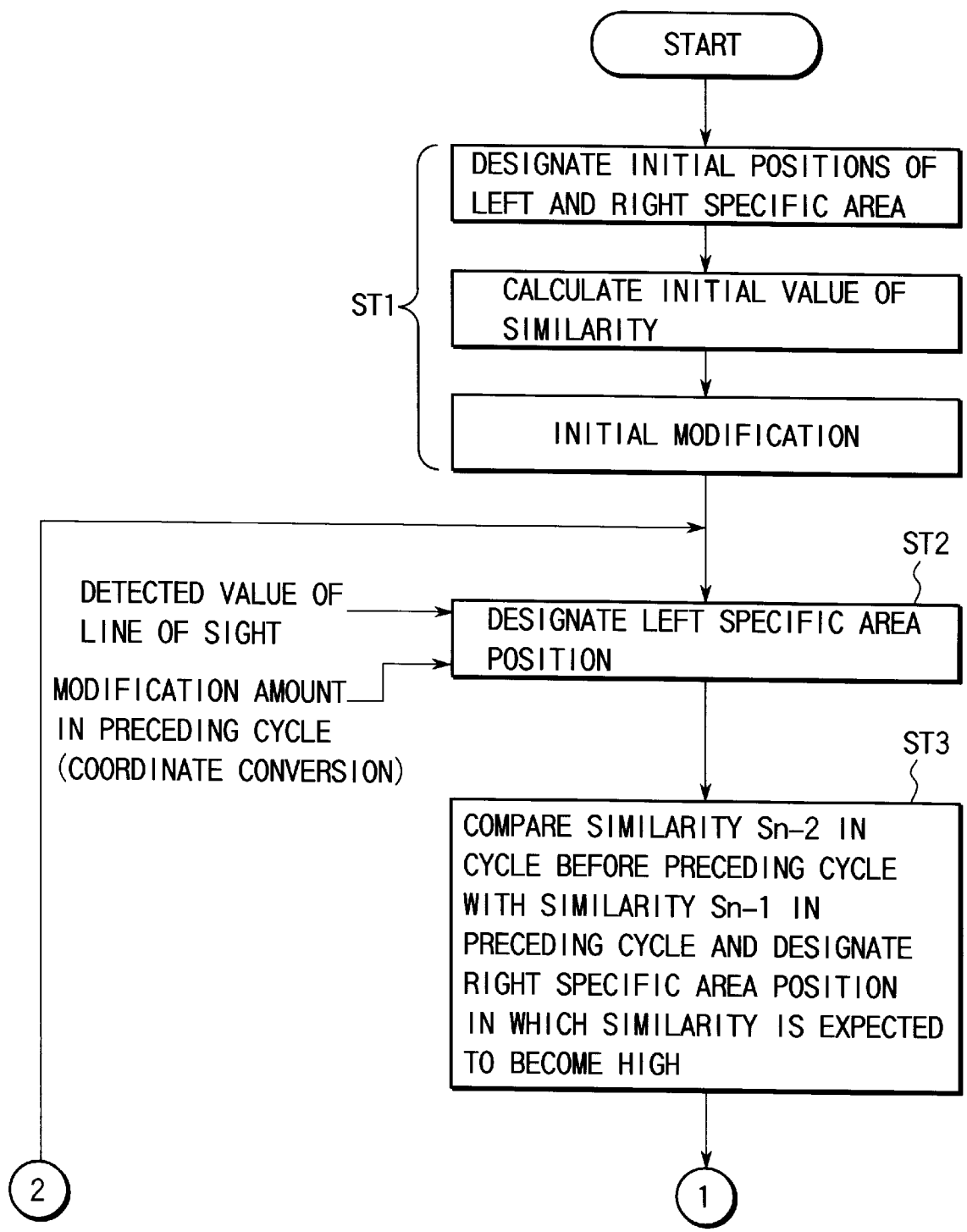
FIG. 12 is a flow diagram for illustrating the concrete operation (part of the operation) of a binocular display apparatus according to a third embodiment of this invention.
Figure 13:
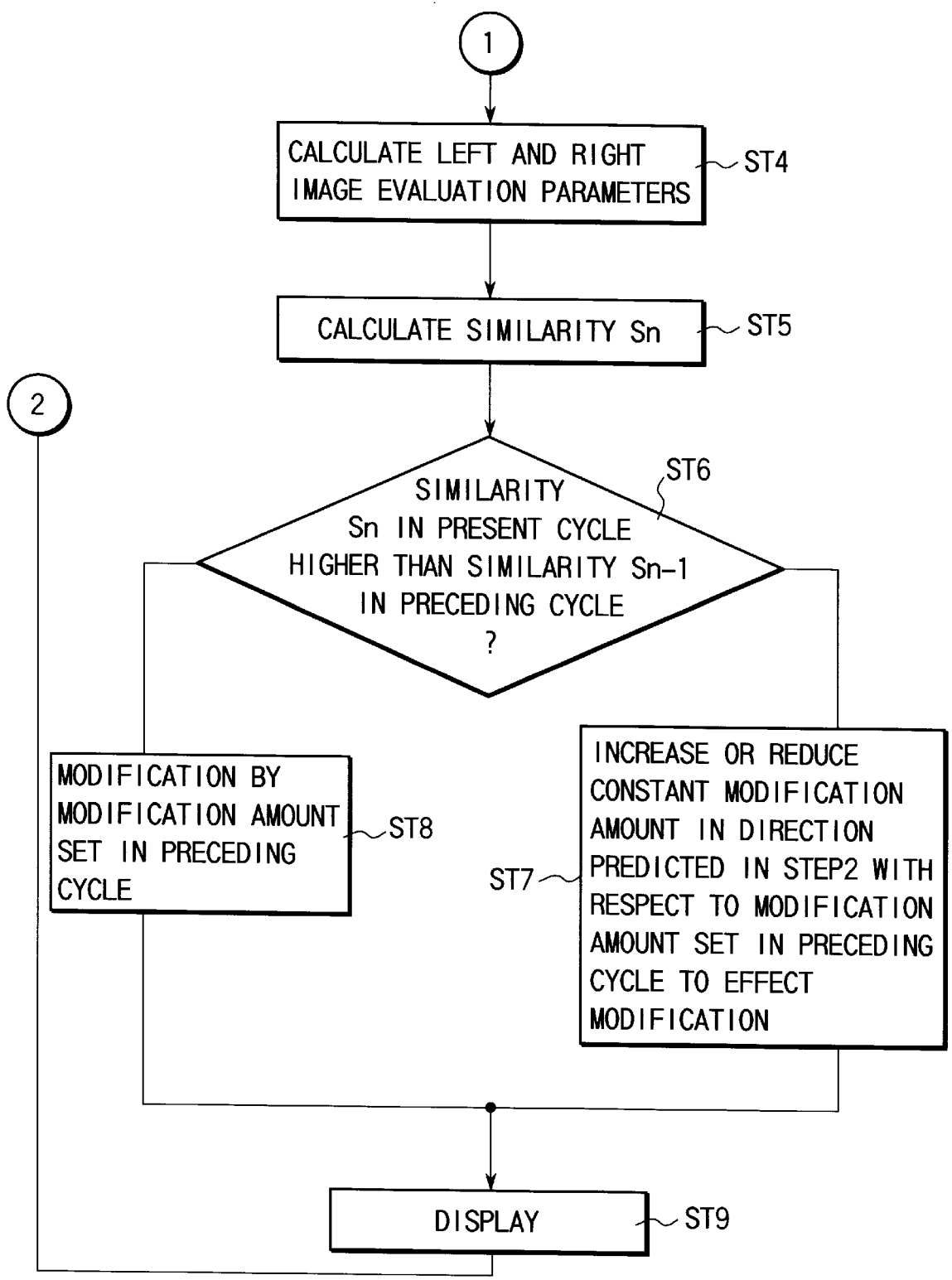
FIG. 13 is a flow diagram for illustrating the concrete operation (remaining part of the operation) of the binocular display apparatus according to the third embodiment of this invention.

FIGS. 12 and 13 are flow diagrams for illustrating the concrete operation of a binocular display apparatus according to a third embodiment of this invention (the flow diagrams in FIGS. 12 and 13 are connected to each other at portions indicated by encircled numbers). The construction block diagram in this embodiment is the same as that of the second embodiment shown in FIG. 3 and therefore it is omitted. In the third embodiment, one of the specific area positions is determined by feeding back the specific area position based on the values of the similarities obtained in the preceding cycle and in the cycle before the preceding cycle and the modification direction (horizontal shifting direction) is determined by feeding back the modification direction based on the values of the similarities obtained in the preceding cycle and in the present cycle. This feature is explained below with reference to the flow diagrams of FIGS. 12 and 13.

In the step 1 (ST1), the initial positions of the left and right specific areas are designated. For example, the left specific area is set at the center of the display plane and the right specific area is set in the position to satisfy the equations (1) and (2). Then, the initial value of similarity is calculated for an input image. The initial value of similarity obtained as the result of calculation is subjected to initial modification by a predetermined modification amount. For example, a shifting process in the right direction by an amount of 1% of the length of the display plane is effected. Designation of the specific area, similarity calculation and image shifting are effected also for a next video frame. However, for the second video frame, the position of the right specific area is moved in the left direction by 1% of the length of the display plane and the image shifting is effected in the right direction by 1% thereof. Thus, the movement amount of the specific area position in one cycle is previously determined. The amount is set to $\Delta A$ in this example. Further, the image shifting amount in one cycle is also previously determined. The amount is set to $\Delta B$ in this example.

In the step 2 (ST2), the line-of-sight detecting process is effected as in the case of the second embodiment and the left specific area position is determined by the left specific area position designator 24L.

In the third step 3 (ST3), the right specific area position designator 24R determines a right specific area position in response to a left specific area position signal from the left specific area position designator 24L. The determination method is as follows. The similarity $S_{n-2}$ in a cycle before the preceding cycle and the similarity $S_{n-1}$ in the preceding cycle are compared with each other and the specific area position is moved to a position in which the similarity is expected to become high.

Figure 14:
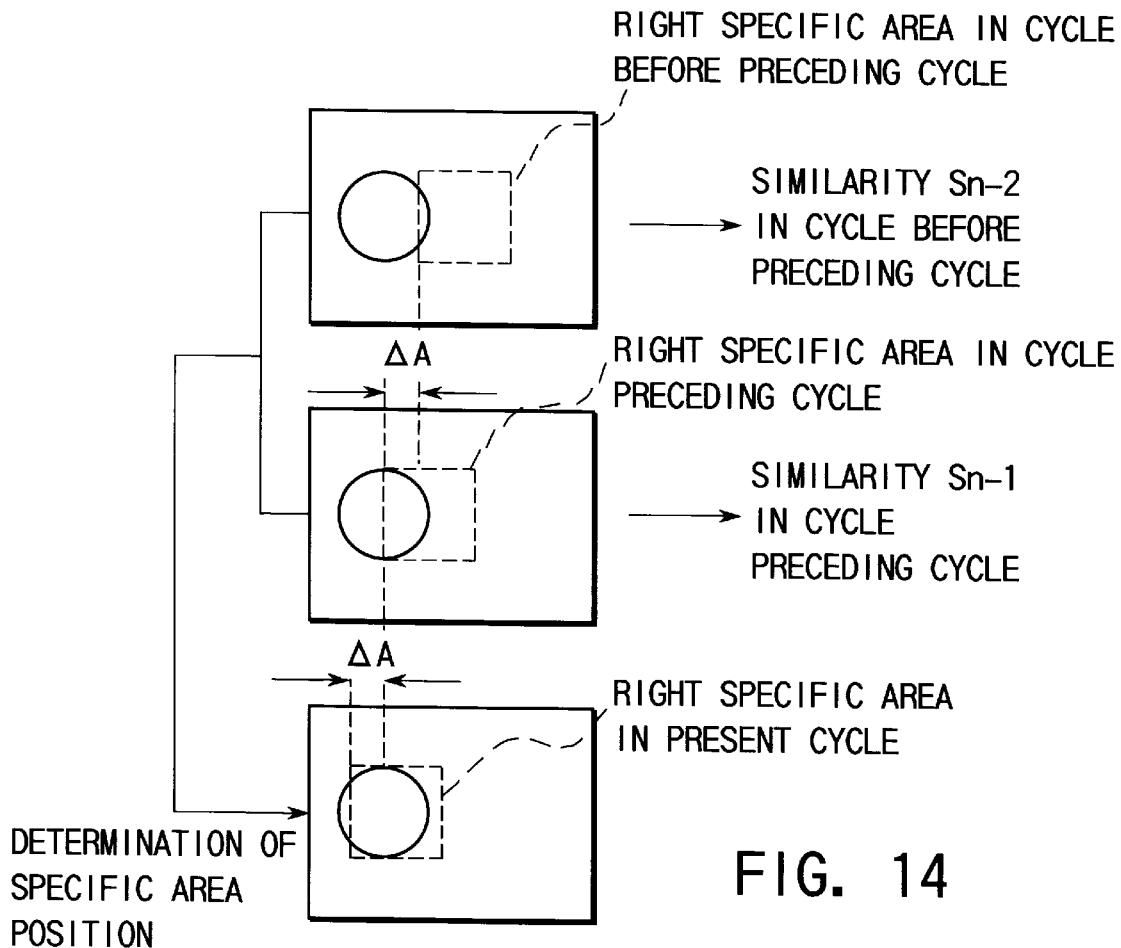
FIG. 14 is a diagram for illustrating the operation of the binocular display apparatus according to a third embodiment of this invention.

For example, in the case of FIG. 14, if it is detected that $S_{n-1}$ is higher than $S_{n-2}$ as the result of comparison between $S_{n-2}$ and $S_{n-1}$, the specific area position is further shifted to the left direction by $\Delta A$. On the other hand, if it is detected that $S_{n-2}$ is higher than $S_{n-1}$ as the result of comparison between $S_{n-2}$ and $S_{n-1}$, the specific area position is shifted to the right direction from the specific area position in the cycle before the preceding cycle by $\Delta A$.

In the step 4 (ST4), image evaluation parameters are calculated in the left and right image evaluation parameter calculators 25L and 25R as in the case of the second embodiment.

In the step 5 (ST5), the similarity $S_n$ is calculated based on the left and right image evaluation parameters in the similarity calculator 26 as in the case of the second embodiment. The result of calculation is supplied to the left and right image modifiers 27L and 27R.

In the step 6 (ST6), whether or not the similarity $S_n$ in the present cycle is higher than the similarity $S_{n-1}$ in the preceding cycle is determined in the left and right image modifiers 27L and 27R.

Figure 15:
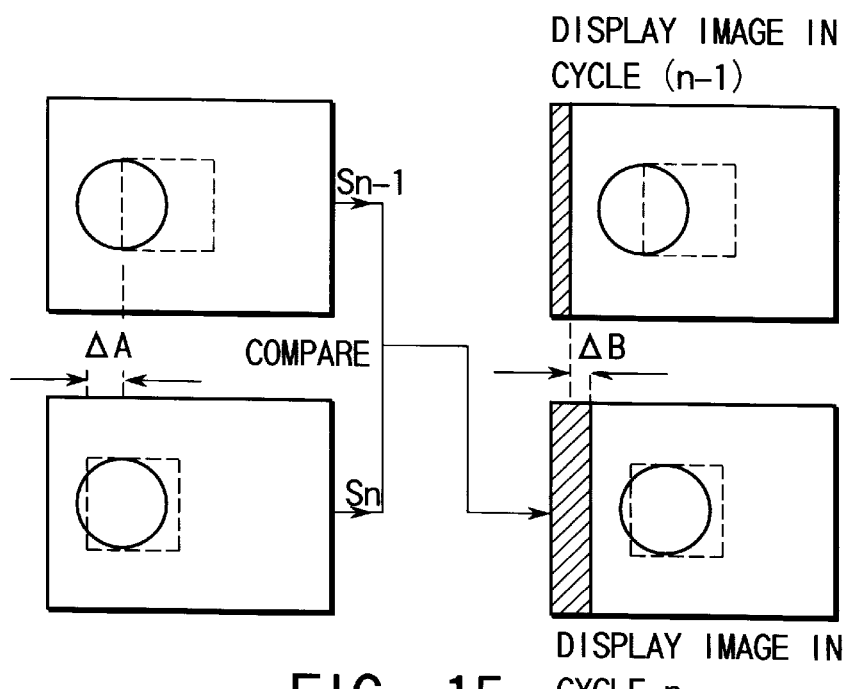
FIG. 15 is a diagram for illustrating the operation of the binocular display apparatus according to a third embodiment of this invention.
Figure 16:
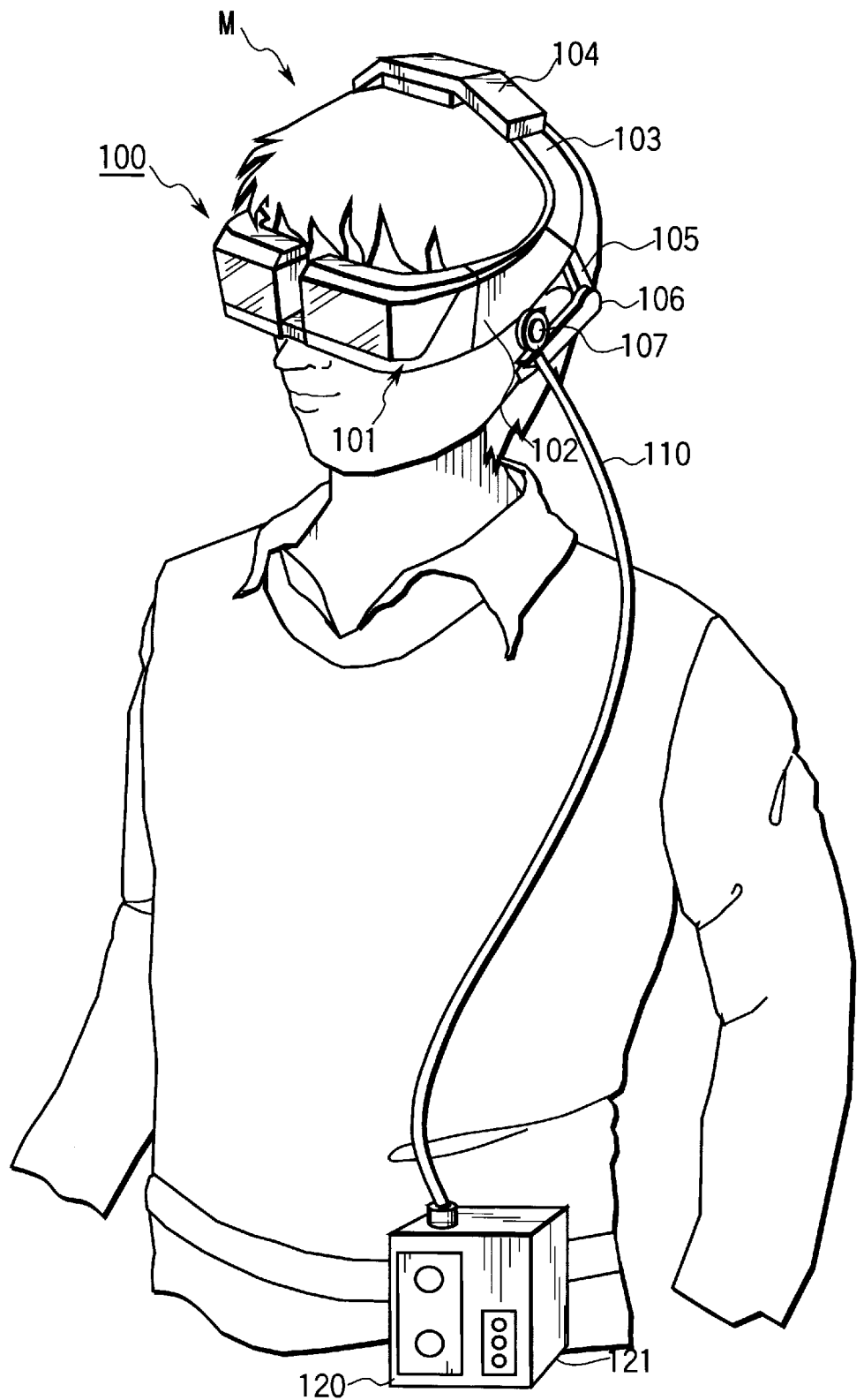
FIG. 16 is an external perspective view showing a state in which a head mounted display device (HMD) which is one application example of a conventional binocular display apparatus is used.
Figure 17A:
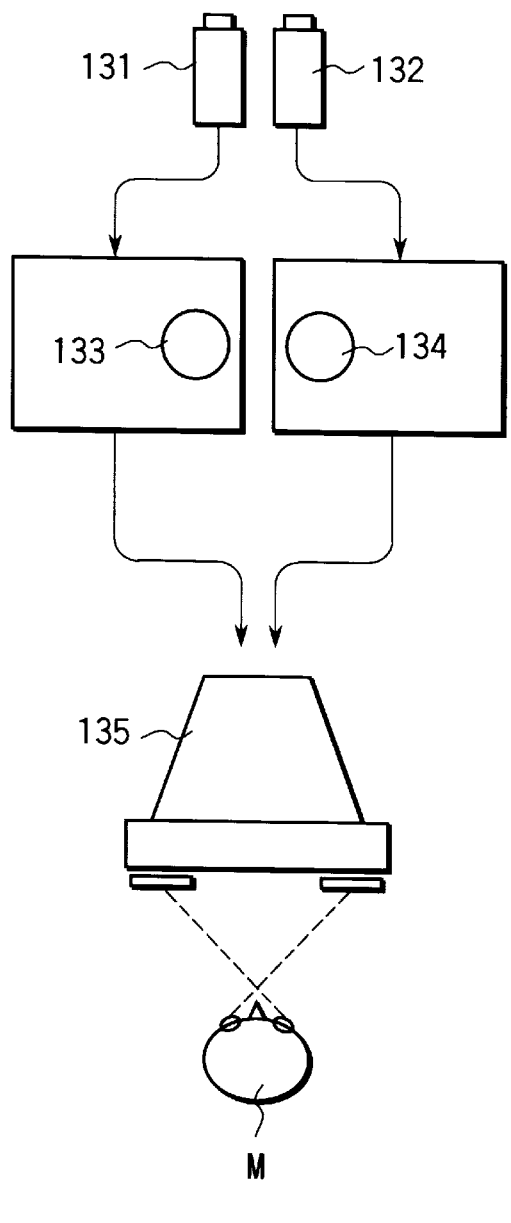
FIGS. 17A and 17B are schematic views for illustrating a problem of the conventional binocular display apparatus.
Figure 17B:
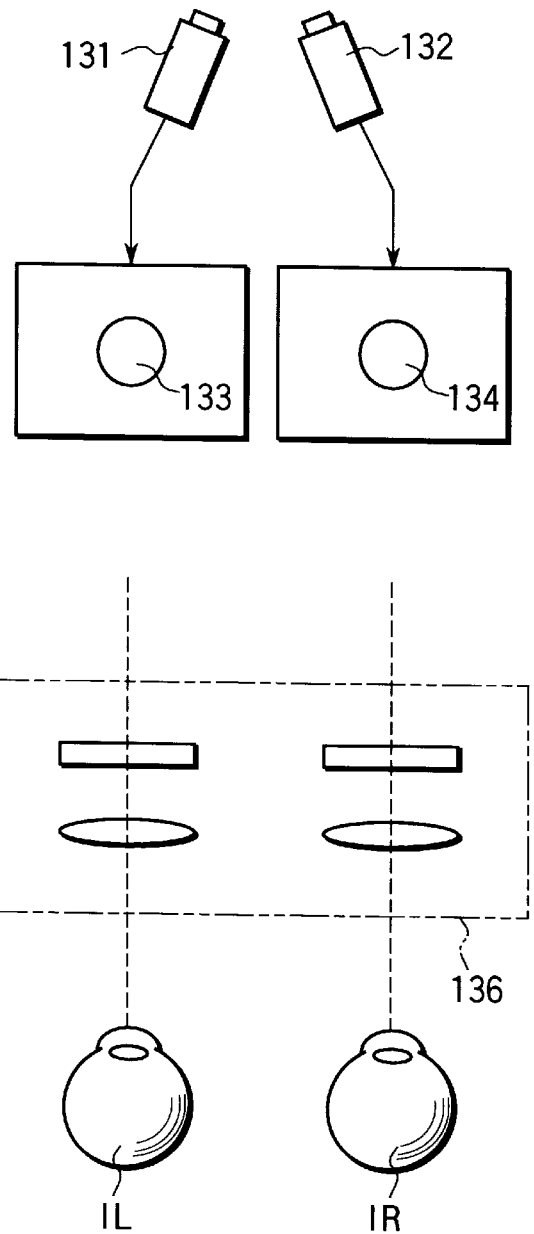

In the step 7 (ST7), the entire image is shifted in the same direction as the shifting direction in the preceding cycle by $\Delta B$ as shown in FIG. 15 when the similarity $S_n$ in the present cycle is higher than the similarity $S_{n-1}$ in the preceding cycle. On the other hand, if the similarity $S_{n-1}$ in the preceding cycle is higher than the similarity $S_n$ in the present cycle, the shifting amount in the preceding cycle is kept.

In the step 8 (ST8), left and right images which have been subjected to modification by shifting are displayed.

The process from the step 2 (ST2) to the step 8 (ST8) is repeatedly effected for each video frame. It is preferable to effect one process of the above steps in 1/60 second or 1/30 second. With this setting, even when motion pictures rapidly moving are dealt with, a large change does not occur between the video frames and it is possible to sufficiently follow the movement of the motion pictures.

According to this embodiment, even when a method of converting the value of the similarity into a modification amount is not known, it is possible to modify the 3-D image to enhance the similarity by use of feedback control.

In the above binocular display apparatus, the left and right images 12L and 12R in the areas which the left and right eyes 1L and 1R closely observe are modified into images having high similarity, and as a result, occurrence of double images and unnatural visual sense can be prevented at the time of observation of the 3-D image. That is, the left and right specific areas 14L and 14R in the image are designated and the similarity between the image portions 12L and 12R in the left and right specific areas 14L and 14R is precisely checked by use of the image evaluation parameters. Based on the result of checking of the similarity, the image portions in the left and right specific areas 14L and 14R initially designated are modified and corrected to exceed a set target value of the similarity. As a result, the positional deviation between the left and right images which causes double images and unnatural visual sense can be corrected. Further, in the above binocular display apparatus, unlike the conventional case, since a process for detecting a corresponding image is not effected and the process thereof is effected by using only the image in the specific area, the image storing capacity can be made small and video signals sequentially supplied can be processed on the real-time basis.

Further, since an area which the observer M closely observes is detected and the close observation area is set as a specific area, the image modification process is effected to enhance the similarity of the close observation area of the observer M irrespective of the position of a portion which the observer M observes and a natural and desired 3-D image can be obtained.

The area and shape of the specific area 74L (74R) are not previously determined and an area which the observer M really wants to see according to the content of the image can be set as the specific area 74L (74R). Thus, a 3-D image which can be more easily fused can be provided.

When the process is effected based on all of the coordinates $\Sigma(xL, yL)$ accumulatively stored in the memory 82 for a preset period of time, occurrence of a state in which the modification amount of a 3-D image is rapidly changed and the 3-D image fluctuates by a rapid change in the line-of-sight direction can be prevented. Thus, the operation can be stabilized.

At the time of modification of the image, the similarity $S_{n-1}$ in the preceding cycle and the similarity $S_n$ in the present cycle are compared with each other to determine the modification direction. With this method, even when a conversion method for converting the value of the similarity S into a modification amount is not known, it is possible to modify the 3-D image to enhance the similarity S by use of feedback control.

Further, in the above method, since an area which the observer M closely observes is detected and the close observation area is set as a specific area, the image modification process is effected to enhance the similarity of the close observation area of the observer M irrespective of the position of a portion which the observer M observes and a natural and desired 3-D image can be obtained.

The area and shape of the specific area 74L (74R) are not previously determined and an area which the observer M really wants to see according to the content of the image can be set as the specific area 74L (74R). Thus, a 3-D image which can be more easily fused can be provided. Further, since the process is effected based on all of the coordinates $\Sigma(xL, yL)$ accumulatively stored for a preset period of time, occurrence of a state in which the modification amount of a 3-D image is rapidly changed and the 3-D image fluctuates by a rapid change in the line-of-sight direction can be prevented and the operation can be stabilized.

Further, according to this invention, sequential time-series 3-D frames represented by sequentially input video signals are dealt as a frame An-2, frame An-1 and frame An, and when the frame An among the sequential time-series video frames is modified, the right-eye (left-eye) specific area position designator compares the similarity Sn-2 for the frame An-2 with the similarity Sn-1 for the frame An-1 and designates the position of the right-eye (left-eye) specific area associated with the frame An according to a correspondence relation which is previously determined based on the result of comparison, and the image modifier compares the similarity Sn--1 for the frame An-1 with the similarity Sn for the frame An and modifies the frame An based on the result of comparison.

Thus, since time transition from the similarity Sn-2 for the frame An-2 to the similarity Sn-1 for the frame An-1 can be recognized and the adjusting operation can be effected to enhance the similarity Sn for the frame An based on the above recognition, a modification process more suitable for each video frame can be effected.

The binocular display apparatus of this invention described above can provide the following effects.

(a) Since image portions in the left and right specific areas in the image are modified and corrected to have a desired similarity and then displayed, occurrence of double images or a 3-D image with unnatural visual sense can be prevented without additionally effecting the parallax calculation.

(b) Since a process for detecting a corresponding image is not necessary unlike the prior art, the capacity of a memory for the process can be made small and video signals sequentially supplied can be processed on the real-time basis.

(c) Since the left and right specific areas can be determined according to the close observation point of the observer, the process can be efficiently and adequately effected.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

We claim:

1. A binocular display apparatus comprising:
   a left-eye image display section for displaying a left-eye image;
   a right-eye image display section for displaying a right-eye image;
   a first specific area position designator for designating the position of one of left-eye and right-eye specific areas in the display plane of one of said left-eye and right-eye image display sections;
   a second specific area position designator for designating the position of the other one of the left-eye and right-eye specific areas in the display plane of the other one of said right-eye and left-eye image display sections based on a correspondence relation previously determined for the position of said one of the left-eye and right-eye specific areas;
   a first image evaluation parameter calculator for numerically expressing an image lying in said one of the left-eye and right-eye specific areas by use of image evaluation parameters to derive a first image evaluation parameter value;
   a second image evaluation parameter calculator for numerically expressing an image lying in the other one of the left-eye and right-eye specific areas by use of image evaluation parameter to derive a second image evaluation parameter value;
   a similarity calculator for calculating the similarity between the left-eye image in the left-eye specific area and the right-eye image in the right-eye specific area by comparing the numerically expressed first image evaluation parameter value with the numerically expressed second image evaluation parameter value; and
   an image modifier for modifying at least one of the left and right images based on the similarity calculated by said similarity calculator.

2. A binocular display apparatus according to claim 1, wherein each of said first and second specific area position designators includes a close observation area detector for detecting a close observation area of an observer.

3. A binocular display apparatus according to claim 1, wherein each of said first and second specific area position designators detects a locus of a close observation area of an observer in a preset period of time and sets an area surrounding the locus as a specific area.

4. A binocular display apparatus according to claim 1, wherein each of said first and second image evaluation parameter calculators numerically expresses the image by using at least two of average luminance of images lying in the areas, a dispersive value of luminance, an average spatial frequency, average chromaticity, and a dispersive value of chromaticity as evaluation parameters.

5. A binocular display apparatus according to claim 1, wherein said image modifier effects at least one of a process for deforming and correcting the image and a process for shifting the entire portion of the image in the horizontal direction to enhance the similarity between the images in the specific areas.

6. A binocular display apparatus in which image signals representing three-dimensional image frames constructed by left-eye and right-eye images are sequentially input according to the time series of the three-dimensional image frames, comprising:
   a left-eye image display section for displaying the left-eye image;
   a right-eye image display section for displaying the right-eye image;

a first specific area position designator for designating the position of one of the left-eye and right-eye specific areas in the display plane of one of said left-eye and right-eye image display sections;

a second specific area position designator for designating the position of the other one of the right-eye and left-eye specific areas in the display plane of the other one of said right-eye and left-eye image display sections based on a correspondence relation previously determined for the position of one of the left-eye and right-eye specific areas;

a first image evaluation parameter calculator for numerically expressing an image lying in the first specific area by use of image evaluation parameters to derive a first image evaluation parameter value;

a second image evaluation parameter calculator for numerically expressing an image lying in the second specific area by use of image evaluation parameters to derive a second image evaluation parameter value;

a similarity calculator for calculating the similarity between an image in the first specific area and an image in the second specific area by comparing the numerically expressed first image evaluation parameter value with the numerically expressed second image evaluation parameter value; and an image modifier for comparing the similarity associated with one of the three-dimensional image frames sequentially provided with the similarity associated with a different one of the three-dimensional image frames which lies before the former three-dimensional image frame and modifying at least one of the left-eye and right-eye images based on the result of similarity comparison.

7. A binocular display apparatus according to claim 6, wherein each of said first and second specific area position designators includes a close observation area detector for detecting a close observation area of an observer.

8. A binocular display apparatus according to claim 6, wherein each of said first and second specific area position designators detects a locus of a close observation area of an observer in a preset period of time and sets an area surrounding the locus as a corresponding one of the left-eye and right-eye specific areas.

9. A binocular display apparatus according to claim 6, wherein sequential time-series three-dimensional video frames represented by an input video signal are dealt as a frame An-2, frame An-1 and frame An, and when the frame An among the sequential time-series video frames is modified, said second specific area position designator compares a similarity Sn-2 for the frame An-2 with a similarity Sn-1 for the frame An-1 and designates the position of the second specific area associated with the frame An according to a correspondence relation which is previously determined based on the result of comparison, and said image modifier compares the similarity Sn-1 for the frame An-1 with a similarity Sn for the frame An and modifies the frame An based on the result of comparison.

10. A binocular display apparatus according to claim 6, wherein each of said first and second image evaluation parameter calculators numerically expresses the image by using at least two of average luminance of images lying in the areas, a dispersive value of luminance, an average spatial frequency, average chromaticity, and a dispersive value of chromaticity as evaluation parameters.

11. A binocular display apparatus according to claim 6, wherein said image modifier effects at least one of a process for deforming and correcting the image and a process for shifting the entire portion of the image in the horizontal direction to enhance the similarity between the images in the specific areas.

12. A binocular display apparatus comprising:

a video signal input section for receiving left and right image signals corresponding to left and right images;

a line-of-sight detector for detecting lines of sight of an observer who observes an image;

a left and right area designator for designating specific areas of the left and right images based on information of the line of sight detected by said line-of-sight detector;

a specific area image pickup unit for extracting left and right specific area image signals corresponding to the specific areas designated by said left and right area designator;

an evaluation parameter calculator for calculating left and right image evaluation parameters based on the left and right specific area image signals;

a similarity calculator for calculating a similarity between images in the left and right specific areas by comparing the left and right image evaluation parameters derived by said evaluation parameter calculator; and an image modifier for modifying at least one of the left and right images based on the similarity calculated by said similarity calculator.

13. A binocular display apparatus according to claim 12, wherein each of said left-eye and eight-eye image evaluation parameter calculators numerically expresses the image by using at least two of average luminance of images lying in the areas, a dispersive value of luminance, an average spatial frequency, average chromaticity, and a dispersive value of chromaticity as evaluation parameters.

14. A binocular display apparatus according to claim 12, wherein said image modifier effects at least one of a process for deforming and correcting the image and a process for shifting the entire portion of the image in the horizontal direction to enhance the similarity between the images in the specific areas.

* * * * *